Patented July 10, 1923.

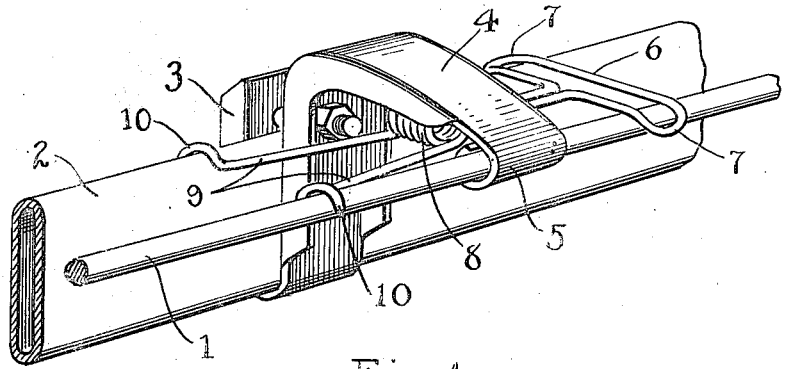
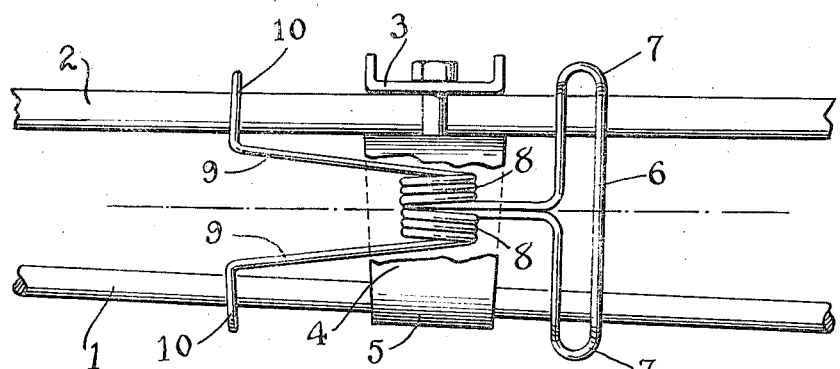
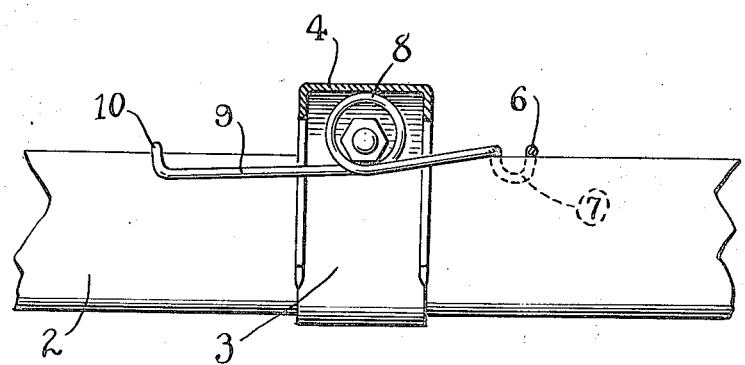

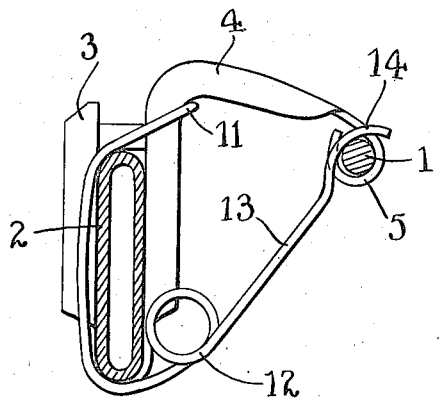
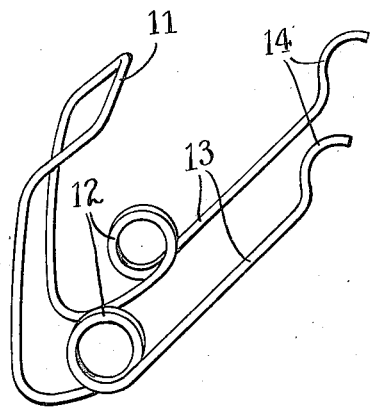
Fig.4.    Fig.5.
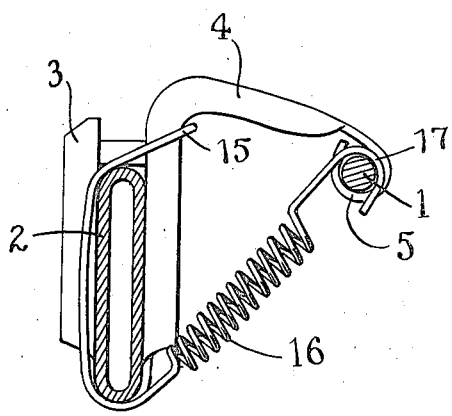
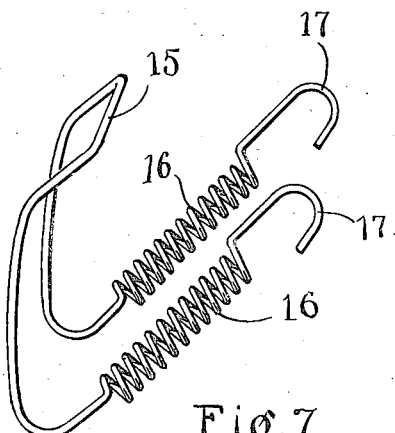
Fig.6.    Fig.7.

1,461,549

UNITED STATES PATENT OFFICE.

FLOYD G. WITHROW AND HAROLD O. VAN ANTWERP, OF GRAND RAPIDS, MICHIGAN; SAID VAN ANTWERP ASSIGNOR TO SAID WITHROW.

ANTIRATTLER.

Application filed November 12, 1921. Serial No. 514,836.

*To all whom it may concern:*

Be it known that we, FLOYD G. WITHROW and HAROLD O. VAN ANTWERP, citizens of the United States of America, residing at Grand Rapids, in the county of Kent and State of Michigan, have invented certain new and useful Improvements in Antirattlers; and we do hereby declare the following to be a full, clear, and exact description of the invention, such as will enable others skilled in the art to which it appertains to make and use the same.

This invention relates to anti-rattlers and more particularly to such devices adapted to eliminate vibration of the so called brake rod in and adjacent to the support or guide which supports it intermediate its ends and in which the said rod moves longitudinally in performing its function.

The device embodying this invention is herein specifically described and illustrated in the accompanying drawings as applied to a certain structure common to the Ford automobile in which the said brake rod and a member known as the radius rod extend substantially parallel. The brake rod support is clamped to the radius rod and has an extending arm provided with an eye through which the brake rod extends. Since these correlated parts do not always maintain perfect alinement the said eye must be sufficiently large to permit free movement of the brake rod therein under all conditions and as there is no tension on the brake rod when the brakes are released to drive the automobile the said rod is ordinarily free to rattle and vibrate in the said eye causing a very annoying sound.

The object of this invention is to provide a simple, cheap and effective device which will eliminate the vibration of the brake rod in the eye of the support but which will not interfere with the longitudinal movement of the rod necessary to its proper functioning.

These and other useful objects are attained by means of the device hereafter fully described and particularly claimed, reference being had to the accompanying drawings in which, Fig. 1 is a fragmentary perspective of the radius rod and brake rod of an automobile with the brake rod support in properly assembled relation and the preferred form of antirattler applied in operative position thereto.

Fig. 2 is a plan view of the same parts shown in Fig. 1 with a portion of the brake rod support broken away.

Fig. 3 is a section on the line 3—3 of Fig. 2.

Fig. 4 is a transverse section through the radius rod and brake rod showing the brake rod support in end elevation with a modified form of anti-rattler applied thereto.

Fig. 5 is a perspective view of the modified anti-rattler shown in Fig. 4.

Fig. 6 is a transverse section similar to Fig. 4 showing another modified form of anti-rattler in operative position, and Fig. 7 is a perspective view of the anti-rattler shown in Fig. 6.

Like numbers refer to like parts in all of the figures.

1 represents the brake rod and 2 the radius rod which extend substantially parallel, the brake rod serving as an actuating medium between the brake of a rear wheel and a hand lever at the driver's seat. As the brake rod is of considerable length it is supported intermediate its ends by the brake rod support 3 which is clamped to the radius rod and has a laterally extending arm 4 terminating in an eye 5 through which the brake rod extends. The brake rod in performing its function moves longitudinally in the eye 5 and this eye either by intent or wear or strain is usually loose about the rod. When the brake is released so that the automobile may be driven, the tension is released from the brake rod and its middle portion hangs loosely in the eye of the support.

The anti-rattler is formed of a single piece of spring wire the middle portion of which is bent to form an elongated loop 6 which extends above and transversely of the brake rod and radius rod and bears upon the upper surfaces of these members the respective ends of the loop 6 being curved downward as at 7 to retain it in place. The two strands of wire joining near the center of the loop extend parallel a short distance and are each curled into coiled springs 8 near the center of the device and these spring portions lie beneath and engage the under side of the arm 4 of the brake rod support which is channel shaped with its flanges depending on either side of the spring portions 8 and prevent the anti-rattler from endwise movement. The wire strands after forming the springs 8 extend substantially parallel in the form of fingers 9 each of which terminates in an outwardly extending hook 10, one of which engages the upper surface of the radius rod 2 and the other hooks over the brake rod 1.

The springs 8 are originally coiled to cause the fingers 9 to extend at a downward angle and when in operative position the loop 6 at one end of the device serves as a cross head to anchor upon the brake rod and radius rod, the spring portions 8 act as a fulcrum bearing on the under side of the arm 4 and the fingers 9 through the hooks 10 exert a constant downward pressure on the radius rod and brake rod, this pressure being sufficient to hold the brake rod snugly against the lower surface of the eye 5 and effectually prevent all rattling between these two members.

The tension and friction thus exerted is not sufficient to impede the longitudinal movement of the brake rod when manually operated but will tend to retain the said rod in place against inadvertent movement from jarring of the machine while in motion.

The respective spring members 8 are preferably coiled closely adjacent each other so that they will by engagement, one with the other, be self supporting and counteract any tendency to turn over by engagement with the arm 4 which is inclined at this point.

The modified structure which is illustrated in Figs. 4 and 5 is likewise made of a single piece of spring wire, its middle portion being formed in a hook 11 which extends under the arm 4 and adjacent the main body of the support 3. The wire strands thence extend over the radius rod 2 and downward at its rear side and are bent under its lower edge and each formed into coils 12 which lie adjacent the front surface of the radius rod. The strands thence incline upward in the form of fingers 13 each of which terminates in a hook 14 which engage the brake rod 1 at opposite sides of the eye 5 and press it outward into close engagement with the outer surface of the eye.

The modification shown in Figs. 6 and 7, also being made of a single piece of spring wire, has its middle portion formed into a loop 15 which extends under the arm 4 and the strands extend over, back of and under the radius rod as in the modification of Figs. 4 and 5. The strands are thence coiled into extension springs 16 which incline diagonally upward toward the brake rod and each terminates in hook 17 which embraces the brake rod and pulls it inward and down into close engagement with the side of the eye 5.

The preferred embodiment of the invention, and also the modification disclosed herein are simple and cheap in construction and easy to apply, they effectively prevent vibration of the brake rod at the point of support and eliminate rattling between the rod and supporting member.

While the anti-rattler has been shown and described as applied to a specific structure it is to be understood that this invention contemplates the use of similar devices applied to analogous structures wherein a rod is supported in the eye of an arm in a similar manner.

We claim:

1. The combination with a brake rod and radius rod extending substantially parallel and a supporting member fixed to the radius rod and having an eye through which the brake rod extends of an anti-rattler engaging both the radius rod and brake rod adjacent the supporting member and exerting a pressure on the brake rod to press it against one surface of said eye.

2. The combination with a brake rod and a supporting arm having a channel portion and an eye through which the brake rod extends of an anti-rattler having an extended portion to fit within the channel of said arm, the anti-rattler engaging the brake rod to press it against one surface of said eye.

3. The combination with a radius rod and a brake rod extending substantially parallel and a support fixed to the radius rod and having a lateral arm of channel structure with an eye through which the brake rod extends, of an anti-rattler formed of a single piece of spring wire its middle portion being formed into a transversely elongated loop which engages the upper surfaces of the radius rod and brake rod, the strands thence extending parallel and formed into coiled springs which enter the channel of said arm, and the strands thence extending substantially parallel and each terminating in a hook which engage respectively the brake rod and radius rod.

4. The combination with a brake rod and radius rod extending substantially parallel and a supporting arm attached to the radius rod and extending laterally therefrom and having an eye through which the brake rod extends of an anti-rattler adapted to engage intermediate its ends the under side of said arm and its ends adapted to engage the upper surfaces of the brake rod and radius rod to exert a downward pressure thereon.

5. The combination with a radius rod and a brake rod and a support for the brake rod attached to the radius rod, of an anti-rattler having a central spring portion with an upward extension to engage the under side of said support, a transverse head at one end to engage the upper surfaces of the radius rod and brake rod and means at its other end to engage the upper surfaces of the radius rod and brake rod.

In testimony whereof we affix our signatures.

FLOYD G. WITHROW.
HAROLD O. VAN ANTWERP.